March 23, 1937. P. B. REEVES ET AL Re. 20,309

AUTOMATIC WARP WIND CONTROL FOR SPINNING FRAMES

Original Filed April 5, 1935 3 Sheets-Sheet 1

INVENTORS
Paul B. Reeves and
BY Harry E. Brooks,
Hood + Hahn.
ATTORNEYS

March 23, 1937. P. B. REEVES ET AL Re. 20,309

AUTOMATIC WARP WIND CONTROL FOR SPINNING FRAMES

Original Filed April 5, 1935 3 Sheets-Sheet 2

INVENTORS
Paul B. Reeves and
Harry E. Brooks,
BY Hood + Hahn.
ATTORNEYS

AUTOMATIC WARP WIND CONTROL FOR SPINNING FRAMES

Original Filed April 5, 1935 3 Sheets-Sheet 3

INVENTORS
Paul B. Reeves and
Harry E. Brooks,
BY Hood + Hahn.
ATTORNEYS

Reissued Mar. 23, 1937

Re. 20,309

UNITED STATES PATENT OFFICE 20,309

AUTOMATIC WARP WIND CONTROL FOR SPINNING FRAMES

Paul B. Reeves and Harry E. Brooks, Columbus, Ind., assignors to Reeves Pulley Company, Columbus, Ind., a corporation of Indiana Original No. 2,065,197, dated December 22, 1936, Serial No. 14,738, April 5, 1935. Application for reissue January 11, 1937, Serial No. 120,885

33 Claims. (Cl. 74—230.17)

The object of the present invention is to produce a fully automatic control for warp winding operations of a spinning frame.

In the prior Patent No. 1,985,838 issued December 25, 1934 to Paul B. Reeves, there is disclosed a semi-automatic mechanism for controlling, through a variable speed drive mechanism of the coned disc type, the speed of a spinning frame in warp winding operations. In that patent, it is stated that, during warp winding operations, the speed of the machine, starting at a predetermined minimum, can be gradually built up, throughout an initial period of the cycle of operation, to a predetermined maximum, and can be held at that maximum throughout the remainder of the cycle. While this is broadly true, we have recently learned that, if the speed of the spinning frame is held at that predetermined maximum, there comes a time, during the later portions of the cycle, when there arises an undesirable vibration and dancing of the bobbins. This effect sometimes results in breakage of the yarn being wound, and can be overcome only by reducing the speed of the spinning frame during those later portions of the cycle.

One of the objects of the present invention, then, is automatically to reduce the speed of the spinning frame during the later portions of the warp winding cycle.

In the mechanism disclosed in the said prior Patent No. 1,985,838, it is necessary for the operator manually to return the control to low-speed starting position, after the completion of a winding cycle, before the next cycle is started. This necessity is undesirable for two reasons; first, because an operator will occasionally forget to adjust the control before restarting his machine, which results in starting the spinning frame at an impossibly high speed and consequently causes an undue amount of breakage; and second, because the transmission mechanism of the coned disc type does not lend itself readily to adjustment when it is not in driving operation.

In the prior patent to Brooks and Reeves No. 1,985,851, issued December 25, 1934, we have disclosed a mechanism, adapted for use in controlling filling wind operations of a spinning frame, which mechanism results in a gradual increase of speed of the spinning frame during an initial period, then the maintenance of a predetermined maximum speed during an intermediate period, and a gradual reduction of speed during a final period of the cycle. However, the changes in the positions of certain parts of the mechanism which result in that operation are dependent upon the fact that, during filling wind operations, the ring rail moves through a stroke of varying position. Consequently, the structure illustrated in the said Patent No. 1,985,851 will not operate to reduce the speed of the spinning frame during a final period of the cycle, when it is used in connection with a spinning frame for warp winding.

In the present application there is disclosed an organization comprising a variable speed driving unit of the coned disc type, and a control therefor, so associated with the ring-rail-driving mechanism of a spinning frame as to cause the driving unit to be automatically adjusted, during the spinning cycle, first to increase the speed of the spinning frame gradually during an initial period of the cycle, then to hold the speed of the spinning frame at optimum maximum during an intermediate period, and then gradually to reduce the speed of the spinning frame during a final period of the cycle, ultimately returning the driving unit to slow starting speed before the completion of the spinning cycle; so that, when the operator is ready to start a new cycle, he need give the variable speed driving mechanism no attention.

In the accompanying drawings.

Figure 1:
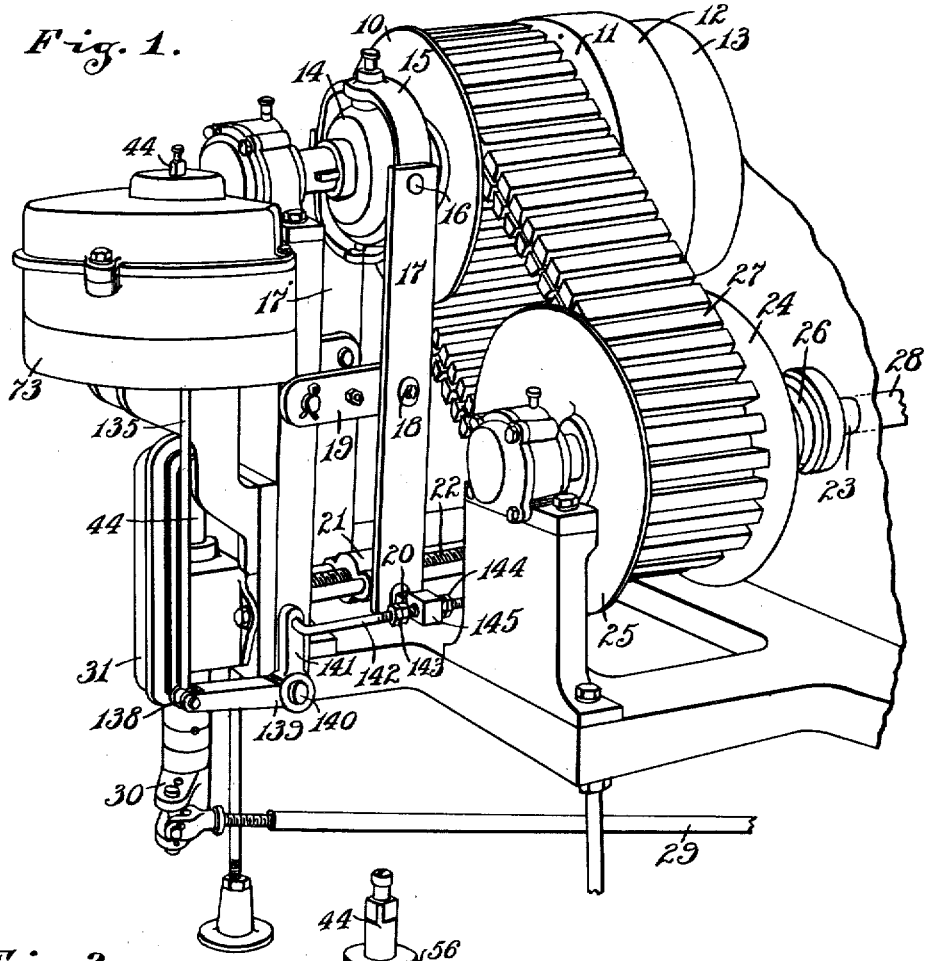
Fig. 1 is a perspective view of a variable speed driving unit and control, constructed in accordance with the present invention.

Referring more particularly to Figs. 1 to 6 inclusive, it will be seen that we have illustrated a driving unit including a pair of coned discs 10 and 11. The disc 11, in the illustrated embodiment, is provided with an annular flange with which may cooperate a driving belt 12. An idler pulley 13 is coaxial with the disc 11 and its flange, so that the belt 12 may, when desired, be moved onto said idler pulley to permit the illustrated drive to come to rest. It will be perfectly obvious that, as a modification, the shaft on which are mounted the discs 10 and 11 may be directly driven by a motor, or may be a motor spindle.

The disc 10 is slidable longitudinally of the shaft upon which it is mounted, there being provided a thrust bearing 14 so connected to the disc 10 as to permit positive actuation of said disc in either direction along said shaft. A yoke 15 is operatively connected to the thrust bearing 14, and carries a pair of oppositely disposed pins 16 through which said yoke is connected to a pair of levers 17 and 17'. The lever 17 is pivotally mounted as at 18 upon an arm 19 secured to the frame of the mechanism; and at its lower end the lever 17 is connected to a trunnion 20 formed on a nut 21 threaded on a screw shaft 22. The lever 17' is similarly connected to the yoke 15 and the nut 21.

A shaft 23 is mounted in the frame of the organization in parallelism with the shaft upon which are mounted the discs 10 and 11. A pair of coned discs 24 and 25 are mounted for rotation with the shaft 23, the disc 24 being axially movable, and being continuously urged toward the disc 25 under the influence of a coiled spring 26. A belt 27 of V-cross section provides a driving connection between the cone pair 10—11 and the cone pair 24—25.

It will be obvious that, as the disc 10 is positively moved toward the disc 11, the belt 27 will be squeezed out toward the peripheries of said discs, whereby the lineal speed of the belt will be increased. Of course, as the belt is so moved by the discs 10 and 11, it will be pulled down into the crotch between the discs 24 and 25, thereby moving the disc 24 toward the right against the tendency of the springs 26. Thus, the ratio of rotational speed of the shaft 23 to lineal speed of the belt 27 will likewise be increased.

At 28, in Fig. 1, is indicated the main shaft of a spinning frame. The spinning frame is not shown, because its construction is well understood. However, for reference, it may be noted that portions of spinning frames are shown in both of the prior patents hereinbefore mentioned.

In all spinning frames used for warp winding, means is provided for effecting relative movement, in a direction parallel to the axes of the bobbins, between the bobbins and the ring rail. In some machines, the ring rail is reciprocated; in other machines, the bobbins are reciprocated. To some suitable element of the train which effects that relative movement, there is connected one end of a link 29.

In warp winding, the stroke of the ring rail (or of the bobbin rail) is at all times equal to the axial extent of the bobbin layer then being wound. That is, it would be proper to say that the stroke is of constant length throughout the spinning cycle, except for the fact that the ends of the yarn body are customarily tapered by progressively shortening the stroke of the ring rail (or bobbin rail) as the winding progresses. Customarily, that shortening is equal at the opposite ends of the stroke, so that the median point of the rail stroke is stationary throughout the spinning cycle.

In filling winding, on the other hand, the rail stroke is always much shorter than the axial extent of the yarn mass; and each upward stroke of the rail is longer than the succeeding downward stroke thereof; so that the median point of the rail stroke in filling winding moves progressively upward during the spinning cycle.

It will be seen, therefore, that, in the illustrated organization, the link 29 will reciprocate through a stroke the median point of which is stationary. Thus, the stroke, while varying somewhat in length during the cycle, may be referred to as "of constant position" throughout the spinning cycle.

Figure 2:
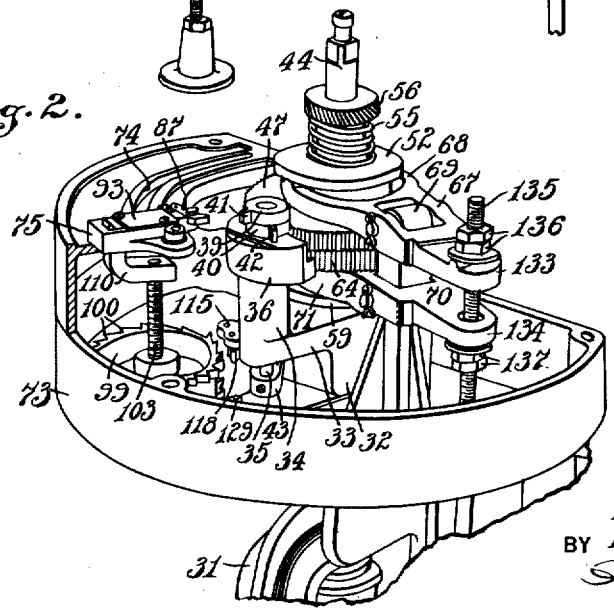
Fig. 2 is a perspective view of the control mechanism, the cover having been removed, and parts having been broken away for clarity of illustration.
Figure 3:
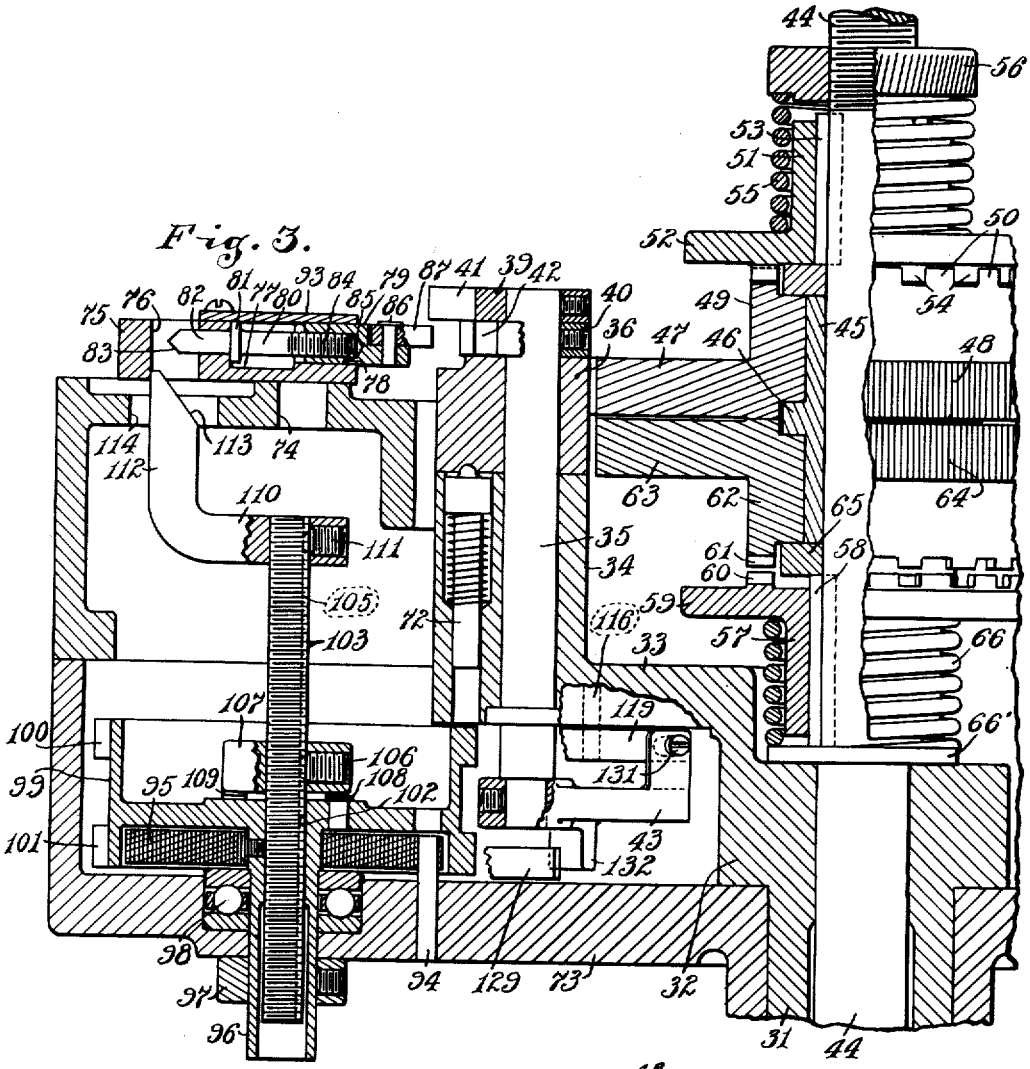
Fig. 3 is a much enlarged fragmental vertical section through part of the control mechanism.

An arm 30 is connected to one end of the link 29, and said arm is suitably connected to oscillate a bow 31 to which, as is clearly shown in Figs. 2 and 3, is connected a block 32 carrying a radially projecting arm 33 upon which is positioned a standard 34. Obviously, then, the standard 34 will oscillate through an arc centered on the center of movement of the arm 30.

The standard 34 is formed with a vertical bore receiving a pin 35 on the upper end of which is secured a pawl 36. The pawl 36 is double ended, having a finger 37 at one end and a finger 38 at the other end.

Above the pawl 36, the pin 35 carries a pair of collars 39 and 40, the collar 39 being superimposed upon the collar 40. The collar 39 is provided with a radially extending finger 41 and the collar 40 is provided with a finger 42. At its lower end, and below the arm 33, the pin 35 carries a radially projecting arm 43.

Coaxial with the center of oscillation of the arm 30 is a shaft 44. Said shaft 44 carries a sleeve 45 having an annular flange 46 intermediate its ends. A ratchet 47, formed with peripheral teeth 48, is sleeved on said sleeve 45 and rests upon the flange 46. It will be seen that the ratchet 47 is free to rotate with respect to the shaft 44.

The ratchet 47 is formed with an upwardly projecting hub 49 which, at its upper end, is provided with crown teeth 50. A clutch member 51 is formed with an annular flange 52 and is slidably keyed on the shaft 44 through the medium of a key 53. Crown teeth 54 depend from the flange 52 for meshing engagement with the teeth 50 of the ratchet 47. A spring 55 surrounds the hub of the clutch member 51 and bears, at one end, upon the flange 52 and at its other end against the lower surface of a nut 56 adjustably positioned on the shaft 44.

A second clutch member 57 is slidably keyed on the shaft 44 through the medium of a key 58; and comprises an annular flange 59 provided with upstanding crown teeth 60 adapted to mesh with depending crown teeth 61 on the hub 62 of a second ratchet 63. The teeth 64 of the ratchet 63 are oppositely pitched with respect to the teeth 48 of the ratchet 47.

As is clearly shown in Fig. 3, the ratchet 63 is supported upon a collar 65 which, in turn, rests upon the key 58, and aids in supporting the sleeve 45. A coiled spring 66 abuts at one end against a flange 66' on the shaft 44, and the other end of said spring engages the flange 59 to urge the clutch member 57 upwardly toward the ratchet 63.

A lever 67 is pivoted intermediate its ends on a standard 69, and one end of said lever is formed as a yoke 68 to engage beneath the flange 52. The second lever 70 is likewise pivoted on said standard 69 and is provided adjacent one end with a yoke 71 engaging over the flange 59. Obviously, the levers 67 and 70 may be operated to disengage the clutch members 51 and 57 from the respective ratchets 47 and 63, against the tendencies of the springs 55 and 66.

The element 34 is provided with a bore, parallel to the bore in which is mounted the pin 35, in which is received a spring-pressed plunger 72 cooperating with the pawl 36 to hold the same resiliently in any one of a plurality of desired positions.

All of the above control mechanism is received within a casing 73 in which is provided a shelf formed with an arcuate slot 74 centered on the axis of the shaft 44. A small housing 75 is supported on said shelf, being adjustably located by means engaging in said slot 74. In Fig. 3, said housing is shown in detail.

Adjacent one end, said housing 75 is formed with a rectangular opening 76. Spaced from said opening by a wall, said housing is formed with a rectangular chamber 77 and a smaller chamber 78 communicating therewith. A head 79 is mounted to slide within the chamber 78, and a stem 80, formed with a rectangular collar 81, is secured to said head 79 and is formed with a portion 82 projecting through said wall and terminating in a beveled surface 83. The opposite end of said stem 80 is threaded as at 84 for adjustable reception in a threaded socket 85 in the head 79. Obviously, the engagement of the collar 81 in the chamber 77 will prevent rotation of the stem 80.

At its outer end, the head 79 is rabbetted to receive a dog 87 pivotally mounted on said head through the medium of a rivet 86. It will be seen that the wall 88 of the rabbetted portion of the head 79 holds the dog 87 against counter-clockwise rotation, as viewed in Fig. 4, beyond the illustrated position; but that the dog is free to move in a clockwise direction about its pivot. Said dog 87 is provided with a finger 89 intended for cooperation with the finger 42 of the collar 40 in a manner later to be described. To a pin 90 carried at the end of said dog opposite the finger 89 is connected one end of a spring 91 which, at its opposite end, is connected to a pin 92 (see Fig. 5) carried on the housing 75; said spring tending to hold the dog 87 in the position illustrated in Fig. 4. A cover 93 forms the upper wall of chambers 77 and 78.

A pin 94 is secured in place in the bottom wall of the casing 73 and forms an anchor for one end of a spiral spring 95. The opposite end of said spring is anchored on a hub 96 which is journaled, through the medium of a ball bearing 98, in a suitable aperture in the bottom wall of the casing 73, being held against upward movement by a set collar 97. Said hub 96 carries a drum 99 in which the spring 95 is housed; and said drum is formed with two series 100 and 101 of ratchet teeth of corresponding pitch.

The drum and hub are formed with a threaded bore 102 in which is received a threaded rod 103 formed with a longitudinally extending kerf or keyway 105.

Adjustably positioned on the rod 103 is a nut 107 provided with a set screw 106 adapted to take into the kerf 105. It will be seen that the function of the nut 107 is to seat against the upper surface of the drum 99 to limit downward movement of the rod 103 with respect to the said drum; but we have found that it is undesirable to permit the whole surface of the nut to come into contact with the drum surface. Therefore, we provide a headed rivet 108 projecting above the drum surface and a stud 109 on the lower surface of the nut 107. As the rod 103 moves down, the head 108 and the stud 109 cooperate to stop downward movement of the rod; but their surfaces are so small that no undesirable jamming takes place.

A member 110 is suitably secured to the rod 103 adjacent its upper end, said member being provided with a set screw 111 taking into the kerf 105. Said member 110 is also provided with an upwardly extending finger 112 formed at its upper end with a beveled surface 113 adapted to cooperate with the beveled surface 83 of the stem 80. Said finger 112 projects through an aperture 114 formed in the above-mentioned shelf, and into the rectangular aperture 76 of the housing 75.

Referring, now, to Fig. 6, attention is again called to the fact that this view is a bottom plan of certain elements of the control. As is clearly shown not only in Fig. 6 but also in Figs. 2 and 5, the arm 33 is provided with a laterally extending ear 115 on the under surface of which is mounted, through the medium of a pivot pin 116, a dog 117, the outer end surface 118 of which is adapted to engage the ratchet teeth 100 of the drum 99. The member 117 is provided with a tail 119 projecting in a direction opposite from the position of the surface 118.

A spring 120 is connected at one end to the dog 117, and at its other end to a pin 121 carried by the ear 115, said spring tending to hold that end of the dog on which the surface 118 is formed against a stop pin 122 carried by the ear 115.

Upon a pin 123 mounted in the bottom wall of the casing 73 there is pivotally mounted a latch 124 provided with a surface 125 which cooperates with the teeth 101 of the drum 99. To one end 126 of the latch 124 is secured one end of a spring 127, the other end of which is connected to a pin 128 mounted in the casing; and said spring 127 tends to hold the surface 125 in cooperative relation with the teeth 101. The latch 124 is provided with a finger 129 projecting beyond the surface 125.

The arm 43 carries an adjustable screw 131 adapted to cooperate with the tail piece 119 of the dog 117, and said arm carries also a finger 132 adapted to cooperate with the finger 129 of the latch 124.

The outer ends 133 and 134 of the levers 67 and 70 are perforated to receive a threaded rod 135 which carries, above the arm 133, a pair of adjustable stop nuts 136, and below the arm 134, a pair of adjustable stop nuts 137. It will be seen that downward movement of the rod 135 will actuate the lever 67 without affecting the lever 70; and that upward movement of the rod 135 will actuate the lever 70 without affecting the lever 67.

The lower end of the rod 135 is connected to one arm 138 of a bellcrank lever 139 pivoted at 140 on the machine frame. To the other arm 141 of said bellcrank lever is connected one end of a rod 142. Said rod is threaded adjacent one end for the adjustable reception of a pair of stop nuts 143 and a pair of stop nuts 144, between which is positioned a block 145 carried on the lever 17, and provided with an enlarged bore through which the threaded portion of the rod 142 freely passes.

Figure 5:
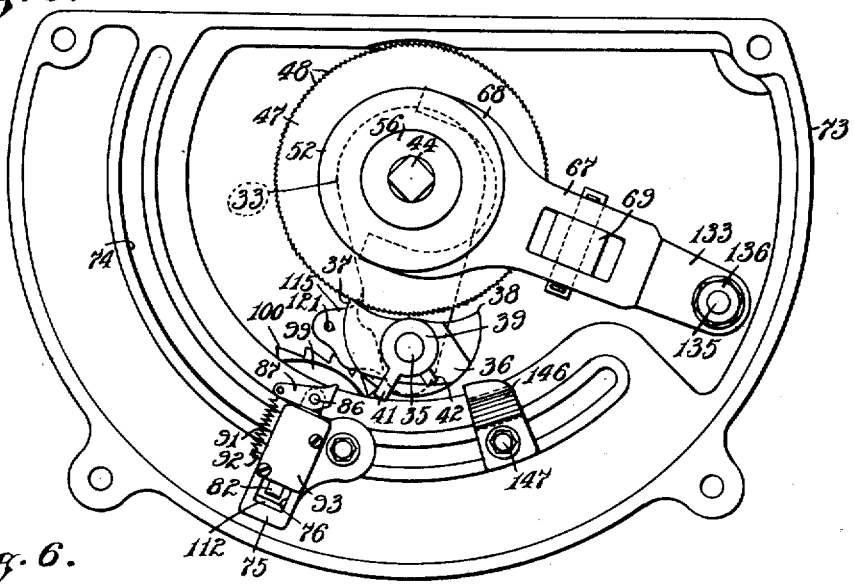
Fig. 5 is a somewhat smaller plan of the control mechanism as a whole.

In Fig. 5 is to be seen a stop member 146 adjustably positioned on the shelf within the casing 73 through the medium of a clamp bolt 147 extending through the slot 74.

In Fig. 1 the parts of the organization are shown in an intermediate position. Starting position of the organization will be that in which the lower ends of the levers 17 and 17' have been moved toward the right to separate the discs 10 and 11, whereby the belt 27 will have been moved more deeply into the crotch between the discs, and the disc 24 will have been moved to a position closer to the disc 25 by the spring 26. With the parts in such a position, the operation of the drive is started, either by shifting the belt 12 onto the flange of the disc 11, or by starting the individual motor associated with the control. As the reciprocating mechanism of the spinning frame operates, the rod 29 will be reciprocated to oscillate the arm 30, bow 31, and arm 33 and standard 34. At this time, the finger 37 of the pawl 36 is in cooperative relation with the teeth 48 of the ratchet 47; and the elements 112, 80, 87, and 89 are in the positions illustrated in full lines in Figs. 3 and 4, wherein the finger 89 is disposed entirely out of the path of the finger 42.

As the pawl 36 is moved through its arc of travel in a clockwise direction, as viewed from above, the finger 37 of said pawl engages in the teeth 48 of the ratchet 47 to carry said ratchet through a partial revolution in a clockwise direction. At this time, the clutch members 51 and 57 are both engaged with their respective ratchets 47 and 63, and consequently movement of the ratchet 47 is transmitted, through the clutch member 51 to the shaft 44, and from said shaft 44 through the clutch member 57 to the ratchet 63. Since the pawl finger 38 is out of cooperative relation with the teeth 64 of the ratchet 63, there is nothing to hinder such movement of the ratchet 63.

The shaft 44 is connected, through a pair of bevel gears or the like, to drive the screw shaft 22 so that, as the shaft 44 is moved in a clockwise direction as viewed from above, the shaft 22 is likewise moved in a clockwise direction as viewed from the left of Fig. 1. Such movement causes the nut 21 to move toward the left as viewed in Fig. 1, thereby moving the disc 10 toward the disc 11, and moving the block 145 toward the stop nuts 143.

Return movement of the arm 33 and pawl 36 in a counter-clockwise direction through their arc of travel does not affect the ratchets 47 and 63, and therefore leaves the shaft 44 stationary.

Thus, the nut 21 is gradually moved, step by step, toward the left of Fig. 1, carrying with it the lower ends of the levers 17 and 17' and the block 145, and moving the disc 10 closer and closer to the disc 11. The manner in which such movement of the disc 10 gradually increases the speed of the main shaft 28 of the spinning frame has heretofore been explained. After a predetermined period, the block 145 comes into contact with the nuts 143, and thereafter further movement of the nut 21 toward the left results in counter-clockwise movement of the bellcrank 139, thereby moving the rod 135 downwardly. Eventually, such downward movement of the rod 135 will tilt the lever 67 sufficiently in a clockwise direction as viewed from the left of Fig. 2, to lift the teeth 54 of the clutch member 51 out of meshing engagement with the teeth 50 of the ratchet 47. Thereafter, of course, further rotation of the ratchet 47 is not transmitted to the shaft 44.

With each movement of the arm 33 in a clockwise direction as viewed from above, the dog 117 ratchets over the teeth 100 of the drum 99. With each counter-clockwise movement of the arm 33, however, the surface 118 comes into engagement with one of the teeth 100 and, because the dog 117 is backed up by the pin 122, the drum 99 is carried with the arm 33 until the arc described by the surface 118 leaves the pitch periphery of the teeth 100. Such movement of the drum 99 carries one of the teeth 101 past the surface 125 of the latch 124; and obviously such movement of the drum also winds somewhat the spring 95.

Since the screw rod 103 is formed with a right-hand thread received in the threaded bore 102 of the drum 99, and since the finger 112 which is received in the rectangular aperture 76 of the housing 75 is rigidly secured to the rod 103 to prevent rotation thereof, such movement of the drum 99 results in a slight elevation of the rod 103 and the finger 112.

Thus, as the speed of the spinning frame is gradually increased by the cooperation of the pawl 36 with the ratchet 47, the finger 112 is gradually elevated by the cooperation of the dog 117 with the drum 99 and the effect of said drum upon the screw rod 103. It has been found that, in many installations, the speed should be gradually increased throughout about one-fourth of the spinning cycle; that the speed should then be continued at that maximum value throughout the next two quarters of the cycle; and that the speed should then be gradually reduced throughout the final quarter of the cycle. Thus, in the illustrated organization, the clutch member 51 will be lifted out of engagement with the ratchet 47 at the end of the first quarter of the spinning cycle. In the illustrated organization, the elements are so related that substantially three-eighths of the spinning cycle is required to bring the beveled surface 113 into contact with the beveled surface 83. Further elevation of the finger 112 will thereafter result in advancement of the head 79 toward the right as viewed in Fig. 3, whereby the finger 89 of the dog 87 will be advanced toward the path of travel of the corner of the finger 42 marked A in Fig. 4. Just before the end of the third quarter of the spinning cycle, the finger 89 will enter the path of the corner A, and will be struck by that corner of the finger 42, whereby the finger 42 will be shifted to move the said corner into the position marked B in Fig. 4. That movement of the finger 42 carries with it, of course, the collar 40, the pin 35, the pawl 36, and the arm 43, whereby the arm 43 is moved into the position illustrated in Fig. 6, and the pawl 36 is moved into neutral position, wherein neither of the fingers 37 or 38 is positioned for cooperation with its associated ratchet teeth. The pawl 36 is held in that neutral position by the action of the plunger 72.

Figure 4:
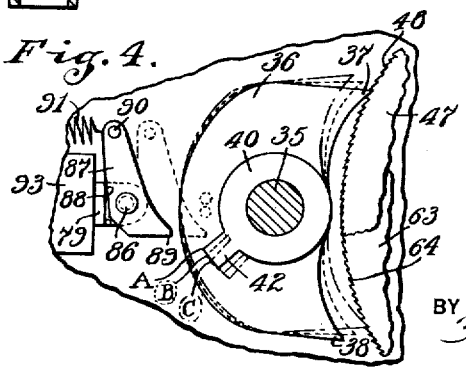
Fig. 4 is a fragmental plan, on the scale of Fig. 3, of the driving pawl and its associated parts.

One or two more oscillations of the arm 33, resulting in further elevation of the rod 103, will move the finger 89 into a position in which it will be struck again by the above-mentioned corner of the finger 42, whereby the leading corner of said finger 42 will be moved into the position marked C in Fig. 4. Thereby, the finger 38 of the pawl 36 is moved into cooperative association with the teeth 64 of the ratchet 63, whereby further oscillation of the arm 33 will cause counter-clockwise rotation of the shaft 44 to move the disc 10 away from the disc 11 to reduce gradually the speed of the spinning frame.

Figure 6:
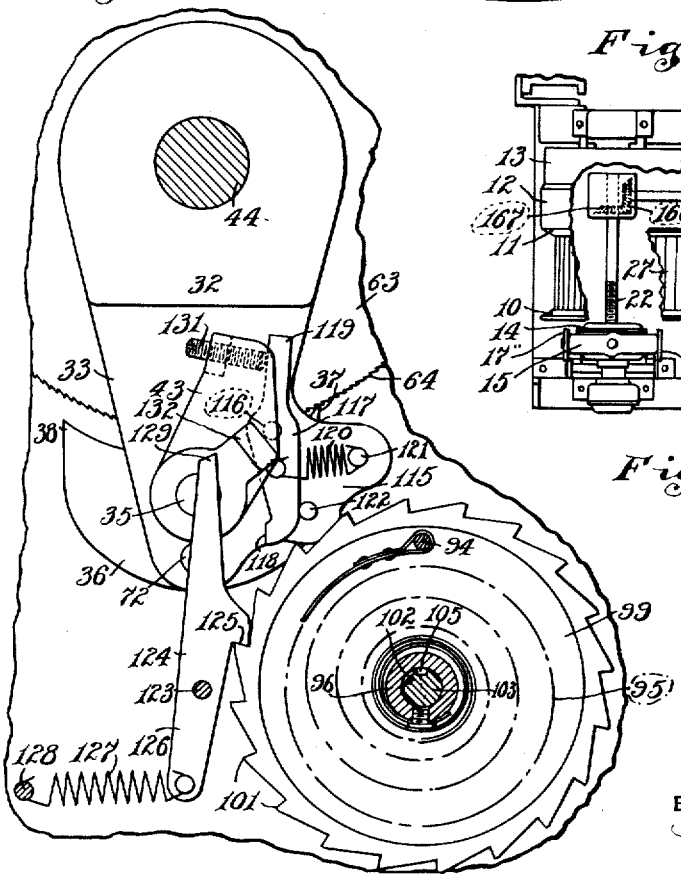
Fig. 6 is a bottom plan view, on a much enlarged scale of the spring-controlling mechanism, parts being shown in section.

Such movement of the finger 42 and pin 35 will likewise shift the arm 43 in a clockwise direction as viewed in Fig. 6, whereby the screw 131, engaging with the tail piece 119 of the dog 117, will rotate said dog in a clockwise direction about the pin 116 to move the surface 118 out of cooperative relation with the teeth 100. Thus, operation of the drum 99 and its associated parts is arrested, and the head 79 is not further advanced.

As the pawl finger 38 continues to advance the shaft 44 in a counter-clockwise direction, the nut 21 is moved farther and farther toward the right as viewed in Fig. 1, whereby the disc 10 is moved farther and farther away from the disc 11. Of course, such movement of the nut shifts the block 145 also to the right, and ultimately said block will come into contact with the stop nuts 144 to shift the rod 142 to the right, thereby moving the bellcrank lever 139 in a clockwise direction to elevate the rod 135. As the rod 135 moves upwardly, the spring 55 depresses the clutch member 51 until ultimately the teeth 54 again mesh with the teeth 50, and thereafter the ratchet 47 will move with the ratchet 63 and the shaft 44. Continued movement of the block 145 toward the right as viewed in Fig. 1 will finally elevate the rod 135 sufficiently to bring the nuts 137 again into contact with the arm 134 of the lever 70, and, as the nut 21 continues to move toward the right, the lever 70 will be rocked to pull the clutch member 57 downwardly against the tendency of the spring 66 to disengage the teeth 60 from the teeth 61. This disengagement will occur when the spinning frame has attained a predetermined minimum speed which is to be the starting speed.

When the spinning cycle is completed, the machine is stopped, and the ring rail is moved to a position below the lowermost position which it assumes during the cycle, to permit the bobbins to be doffed. Such movement of the ring rail is transmitted, through the link 29, arm 30, and bow 31, to the arm 33 which thereupon is moved to a position farther to the right, as viewed in Fig. 5, than any position which it assumes during the spinning cycle. Such movement causes the finger 132 (Fig. 6) to engage the finger 129 to shift the surface 125 of the latch 124 out of engagement with the teeth 101 of the drum 99. Thereby, the spring 95 is released and is permitted to rotate the drum 99 in a counter-clockwise direction, as viewed in Fig. 2, whereby the screw rod 103 is pulled downwardly, thus retracting the finger 112. As the finger 112 moves downwardly, the spring 91 retracts the head 79 to move the collar 81 to the position illustrated in Fig. 3.

Such movement of the arm 33 also brings the finger 41 of the collar 39 into contact with the stop 146 to return the pawl 36 to a position in which the finger 37 thereof is in cooperative relation with the teeth 48 of the ratchet 47.

The organization is now in condition to start a new cycle; and it will be seen that that condition has been reached without special attention to the control on the part of the operator.

Figure 7:
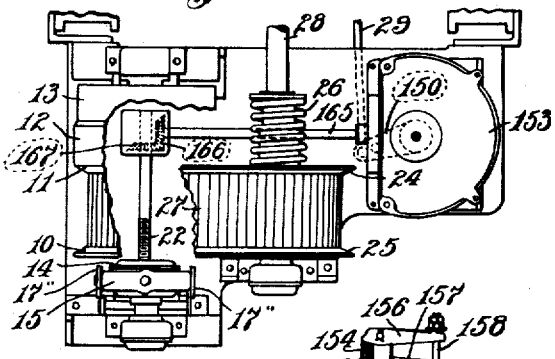
Fig. 7 is a reduced top plan of a modified form of the invention, parts being broken away for clarity of illustration.
Figure 8:
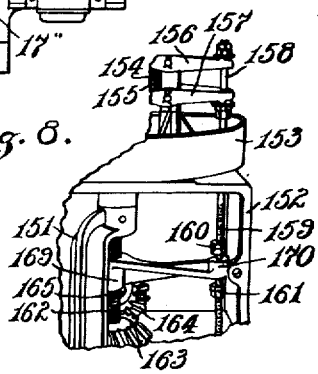
Fig. 8 is a fragmental perspective of parts of the control mechanism.

In Figs. 7 and 8 we have disclosed a slightly modified form of the invention disclosed in Figs. 1 to 6. Many of the parts of the embodiment of Figs. 7 and 8 are identical with corresponding parts of the embodiment of Figs. 1 to 6; and some of such parts have not been illustrated.

It will be clearly seen from a consideration of Fig. 1 that, in the embodiment illustrated therein, the control mechanism is spaced outwardly from the spinning frame in the direction of the axis of the main shaft of the frame. There are many situations in which such an arrangement is undesirable, from considerations of space requirement, and in such situations the organization of Figs. 7 and 8 is more acceptable. In Fig. 7 there are to be seen fragments of the discs 10 and 11, the belt 12, the idler pulley 13, the thrust bearing 14, the yoke 15, and levers 17'' similar to levers 17 and 17'. The levers 17'' are operated by a nut threaded on the shaft 22. In said figure are also to be seen the discs 24 and 25, the spring 26, a fragment of the belt 27 a fragment of the main shaft 28, and a fragment of the link 29.

In the embodiment of Figs. 7 and 8, the control mechanism is located to one side of the drive. It comprises an arm 150 similar to the arm 30, to which the link 29 is connected. That arm transmits oscillatory movement, through a bow 151 similar to the bow 31, to mechanism disposed in a casing 153 similar to the casing 73. That mechanism is in all respects identical with the mechanism disclosed in Figs. 1 to 6, and includes ratchets 154 and 155 clutched to an operating shaft through the medium of clutches adapted to be disengaged by levers 156 and 157 similar to the levers 67 and 70, said levers being operable by a rod 158.

The rod 158 extends downwardly through the bottom of the casing 153 and into a base casing 152, the portion of the rod 158 within said casing 152 being threaded as at 159. Adjustably mounted on the threaded portion of the rod are a pair of stop nuts 160 and another pair of stop nuts 161 for a purpose later to be described.

The operating shaft 162 upon which the ratchets 154 and 155 are mounted likewise extends downwardly into the casing 152; and within said casing, said shaft carries a beveled pinion 163 meshing with a beveled gear 164 carried on a shaft 165. Said shaft 165 extends outwardly through the wall of the casing 152 and carries, at its opposite end, a beveled pinion 166 meshing with a beveled gear 167 carried on the shaft 22.

A portion of the operating shaft 162 within the casing 152 is formed with a left-hand thread upon which is threaded a nut 169 carrying an arm terminating in a block 170 through the bore of which the rod 158 extends loosely, said block being disposed between the nut pair 160 and the nut pair 161.

It will be seen that, as the shaft 162 is rotated in a clockwise direction, as viewed from above, the shaft 165 will be rotated in a counter-clockwise direction as viewed in Fig. 8. Thereby, the shaft 22 will be rotated in a clockwise direction as viewed from the bottom of Fig. 7, whereby the disc 10 will be shifted toward the disc 11. At the same time, the nut 169 and block 170 will be moved gradually downward until the lever 156 is rocked to disengage the clutch member cooperating with the ratchet 154.

Similarly, as the shaft 162 is rotated in a counter-clockwise direction by the action of the ratchet 155, the shaft 22 will be rotated in a counter-clockwise direction to move the disc 10 away from the disc 11, and the nut 169 and block 170 will be moved upwardly to rock the lever 157 to disengage the clutch cooperating with the ratchet 155.

We claim as our invention:

1. In a device of the class described, rotating driving means, driven means including a vibrating member, a variable speed transmission operatively connected between said driving means and said driven means, and including an element oppositely shiftable to vary oppositely the speed ratio between said driving means and said driven means, and means controlling said element comprising a member driven by said vibrating member through an oscillatory stroke of constant position, means for translating the oscillatory movement of said last-mentioned member into step-by-step movement of said element in either direction, and means actuated by the oscillatory movement of said last-mentioned member to reverse the directional effect of said last-named means upon said member.

2. In a device of the class described, rotating driving means, driven means including a vibrating member, a variable speed transmission operatively connected between said driving means and said driven means, and including an element oppositely shiftable to vary oppositely the speed ratio between said driving means and said driven means, and means controlling said element comprising a member driven by said vibrating member through an oscillatory stroke of constant position, means for translating the oscillatory movement of said last-mentioned member into step-by-step movement of said element in a speed-increasing direction, and means actuated by such oscillatory movement of said last-mentioned member to cause said translating means to drive said element step-by-step in a speed-decreasing direction.

3. In combination, a rotating driving means, driven means, a variable speed transmission operatively connected between said driving means and said driven means and including an element shiftable to vary the speed ratio between said driving means and said driven means, and means for controlling said element, comprising an oscillating shaft, means connecting said driven means to impart to said oscillating shaft an oscillatory stroke of constant position, one-way drive mechanism connecting said oscillating shaft to move said element step-by-step in one direction, one-way drive mechanism connecting said oscillating shaft to move said element step-by-step in the opposite direction, and means associated with said one-way drive mechanism and operable automatically, during the cycle of operation of said oscillating shaft, first to render one only of said one-way drive mechanisms effective to move said element, then to render both of said one-way drive mechanisms ineffective to move said element, and then to render the other only of said one-way drive mechanisms effective to move said element.

4. In a device of the class described, a shaft, means for oscillating said shaft through a stroke of constant position, a second shaft coaxial with said first shaft and rotatable with respect thereto, a pair of ratchet wheels mounted on said second shaft and having oppositely-pitched teeth, an arm rigid with said first shaft, a double-ended pawl pivotally carried at the free end of said arm and cooperable with said ratchet wheels, and means automatically operable upon continued oscillation of said arm, to shift said pawl into a position for cooperation with one of said ratchets, then into a position out of cooperative relation with both of said ratchets, and then into a position for cooperation with the other of said ratchets only.

5. In a device of the class described, a shaft, means for oscillating said shaft through a stroke of constant position, a second shaft coaxial with said first shaft and rotatable with respect thereto, a pair of ratchet wheels loosely mounted on said second shaft and having oppositely-pitched teeth, clutch means for clutching one of said ratchets to said second shaft, clutch means for clutching the other of said ratchets to said second shaft, an arm rigid with said first shaft, a double-ended pawl pivotally carried at the free end of said arm and cooperable with said ratchet wheels, and means automatically operable upon continued oscillation of said arm, to shift said pawl into a position for cooperation with one of said ratchets, then to disengage the clutch means associated with said one ratchet, then to shift said pawl into a position for cooperation with the other of said ratchets only, and then to disengage the clutch means associated with said other ratchet.

6. In a device of the class described, a shaft, an arm fixed on said shaft, means for oscillating said shaft through a stroke of constant position, a second shaft coaxial with said first shaft and rotatable with respect thereto, ratchet mechanism comprising two sets of oppositely-pitched ratchet teeth mounted on said second shaft, a double-ended pawl carried at the free end of said arm and shiftable for alternative cooperative association with either of said sets of teeth, and means mounted adjacent the path of the free end of said arm and shiftable into the path of said pawl, upon operation of said oscillating shaft through a predetermined number of oscillations, to shift said pawl out of cooperative association with one of said tooth sets and into cooperative association with the other of said tooth sets.

7. In a device of the class described, a shaft, an arm fixed on said shaft, means for oscillating said shaft through a stroke of constant position, a second shaft coaxial with said first shaft and rotatable with respect thereto, a ratchet wheel mounted on said second shaft, a pawl carried at the free end of said arm and shiftable into and out of cooperative association with said ratchet, abutment means mounted adjacent the path of the free end of said arm, means for shifting said abutment into the path of said pawl, upon operation of said oscillating shaft through a predetermined number of oscillations, said abutment means being cooperable with said pawl, when so shifted, to shift said pawl out of cooperative association with said ratchet.

8. In a device of the class described, a shaft, an arm fixed on said shaft, means for oscillating said shaft through a stroke of constant position, a second shaft coaxial with said first shaft and rotatable with respect thereto, ratchet mechanism comprising two sets of oppositely-pitched ratchet teeth mounted on said second shaft, a double-ended pawl carried at the free end of said arm and shiftable for alternative cooperative association with either of said sets of teeth, means engageable with said pawl at a point beyond one limit of the normal stroke of said arm for shifting said pawl into cooperative association with one of said tooth sets, and means mounted adjacent the path of the free end of said arm within the limits of the normal stroke of said arm and cooperable with said pawl, upon operation of said oscillating shaft through a predetermined number of oscillations, to shift said pawl into cooperative association with the other of said tooth sets.

9. In combination, a shaft, ratchet mechanism comprising two sets of oppositely-pitched teeth mounted on said shaft, an oscillating arm, a double-ended pawl carried by said arm and shiftable for alternative cooperative association with either of said sets of teeth, an abutment member disposed adjacent the path of travel of said pawl, but normally outside said path, and means actuated by oscillation of said arm for advancing said abutment member into the path of said pawl, whereby subsequent strokes of said arm result in shifting said pawl out of cooperative relation with one of said tooth sets and into cooperative relation with the other of said tooth sets.

10. In combination, a shaft, ratchet mechanism comprising two sets of oppositely-pitched teeth mounted on said shaft, an oscillating arm, a double-ended pawl carried by said arm and shiftable for alternative cooperative association with either of said sets of teeth, an abutment member disposed adjacent the path of travel of said pawl, but normally outside said path, screw means for advancing said abutment member into the path of said pawl, and means carried by said arm for actuating said screw means upon oscillation of said arm.

11. In combination, a shaft, ratchet mechanism comprising two sets of oppositely-pitched teeth mounted on said shaft, an oscillating arm, a double-ended pawl carried by said arm and shiftable for alternative cooperative association with either of said sets of teeth, an abutment member disposed adjacent the path of travel of said pawl, but normally outside said path, screw means for advancing said abutment member into the path of said pawl, means carried by said arm for actuating said screw means, upon oscillation of said arm, to advance said abutment member, means, energized during such advancement, for withdrawing said abutment member, and means carried by said arm, and operable upon movement of said arm to a position beyond one limit of the normal stroke of said arm, to release said energized withdrawing means.

12. In combination, a shaft, ratchet mechanism comprising two sets of oppositely-pitched teeth mounted on said shaft, an oscillating arm, a double-ended pawl carried by said arm and shiftable for alternative cooperative association with either of said sets of teeth, an abutment member disposed adjacent the path of travel of said pawl, but normally outside said path, screw means for advancing said abutment member into the path of said pawl, an element rotatable to actuate said screw means, a spring operatively associated with said element, means carried by said arm for rotating said element step-by-step, upon oscillation of said arm, to advance said screw means and to wind said spring, latch means holding said element against return rotation under the influence of said spring, and means carried by said arm, and operable upon movement of said arm to a position beyond one limit of the normal stroke of said arm, to release said latch means.

13. In combination, a shaft, a ratchet wheel mounted on said shaft, an oscillating arm, a pawl carried on said arm and shiftable into and out of cooperative relation with said ratchet, an abutment member disposed adjacent the path of travel of said pawl but normally outside said path, and means actuated by oscillation of said arm for advancing said abutment member into the path of said pawl, whereby subsequent strokes of said arm result in shifting said pawl out of cooperative relation with said ratchet.

14. In combination, a rotatable shaft, a ratchet wheel mounted on said shaft, an oscillating arm, a pawl carried on said arm and shiftable into and out of cooperative relation with said ratchet, an abutment member disposed adjacent the path of travel of said pawl but normally outside said path, screw means for advancing said abutment member into the path of said pawl, and means carried by said arm for actuating said screw means upon oscillation of said arm.

15. In combination, a shaft, a ratchet wheel mounted on said shaft, an oscillating arm, a rock shaft carried by said arm on an axis substantially parallel with the axis of said shaft, a pawl rigid on said rock shaft and shiftable into and out of cooperative association with said ratchet by rocking movement of said rock shaft, an abutment member disposed adjacent the path of said pawl but normally outside said path, screw means for advancing said abutment member into said path and including an element rotatable in one direction to advance said abutment member and rotatable in the opposite direction to withdraw said abutment member, means carried by said arm for rotating said element step-by-step in an abutment-advancing direction upon oscillation of said arm, and means carried by said rock shaft and operable, when said pawl is shifted by engagement with said abutment member, to shift said last-named means out of driving relation with said element.

16. In combination, a shaft, a ratchet wheel mounted on said shaft, an oscillating arm, a rock shaft carried by said arm on an axis substantially parallel with the axis of said shaft, a pawl rigid on said rock shaft and shiftable into and out of cooperative association with said ratchet by rocking movement of said rock shaft, an abutment member disposed adjacent the path of said pawl but normally outside said path, screw means for advancing said abutment member into said path and including an element rotatable in one direction to advance said abutment member and rotatable in the opposite direction to withdraw said abutment member, a spring resisting abutment-advancing rotation of said element, means carried by said arm for rotating said element step-by-step in an abutment-advancing direction upon oscillation of said arm, latch means holding said element against abutment-withdrawing rotation under the influence of said spring, means carried by said rock shaft and operable, when said pawl is shifted by engagement with said abutment member, to shift said last-named means out of driving relation with said element, and other means operable, when said arm is moved to a position beyond one limit of its normal stroke, to release said latch.

17. A control for a variable speed transmission having an element shiftable in opposite directions to vary oppositely the speed differential effected by said transmission, comprising an oscillating arm driven by said transmission, a double-ended pawl carried on said arm, a shaft, a first ratchet loosely mounted on said shaft and having teeth engageable by one end of said pawl, clutch means resiliently urged to clutch said first ratchet to said shaft, a second ratchet loosely mounted on said shaft and having teeth engageable by the other end of said pawl, the teeth of said second ratchet being oppositely pitched with respect to the teeth of said first ratchet, clutch means resiliently urged to clutch said second ratchet to said shaft, means connecting said shaft to drive said shiftable element in either direction, means actuated by rotation of said shaft in one direction to disengage said first clutch means, means actuated by continued oscillation of said arm to shift said pawl out of engagement with said first ratchet and into engagement with said second ratchet, and means actuated by rotation of said shaft in the opposite direction to disengage said second clutch means.

18. A control for a variable speed transmission having an element shiftable in opposite directions to vary oppositely the speed differential effected by said transmission, comprising an arm driven by said transmission through an oscillatory stroke of constant position, a double-ended pawl carried on said arm, a shaft, a first ratchet loosely mounted on said shaft and having teeth engageable by one end of said pawl, clutch means resiliently urged to clutch said first ratchet to said shaft, a second ratchet loosely mounted on said shaft and having teeth engageable by the other end of said pawl, the teeth of said second ratchet being oppositely pitched with respect to the teeth of said first ratchet, clutch means resiliently urged to clutch said second ratchet to said shaft, means connecting said shaft to drive said shiftable element in either direction, means actuated by rotation of said shaft in one direction to disengage said first clutch means, means actuated by continued oscillation of said arm to shift said pawl out of engagement with said first ratchet and into engagement with said second ratchet, and means actuated by rotation of said shaft in the opposite direction to disengage said second clutch means.

19. A control for a variable speed transmission having an element shiftable in opposite directions to vary oppositely the speed differential effected by said transmission, comprising an oscillating arm driven by said transmission, a double-ended pawl carried on said arm, a shaft, a first ratchet loosely mounted on said shaft and having teeth engageable by one end of said pawl, clutch means resiliently urged to clutch said first ratchet to said shaft, a second ratchet loosely mounted on said shaft and having teeth engageable by the other end of said pawl, the teeth of said second ratchet being oppositely pitched with respect to the teeth of said first ratchet, clutch means resiliently urged to clutch said second ratchet to said shaft, means connecting said shaft to drive said shiftable element in either direction, means actuated by rotation of said shaft in one direction to disengage said first clutch means, an abutment member normally disposed outside the path of said pawl, screw means including a rotatable member for advancing said abutment member into the path of said pawl, means carried by said arm and operable, upon oscillation of said arm, to rotate said rotatable member step-by-step in an abutment-advancing direction whereby, after a predetermined number of oscillations of said arm, said pawl strikes said abutment member and is thereby moved out of engagement with said first ratchet and into engagement with said second ratchet, and means actuated by rotation of said shaft in the opposite direction to disengage said second clutch means.

20. A control for a variable speed transmission having an element shiftable in opposite directions to vary oppositely the speed differential effected by said transmission, comprising an oscillating arm driven by said transmission, a double-ended pawl carried on said arm, a shaft, a first ratchet loosely mounted on said shaft and having teeth engageable by one end of said pawl, clutch means resiliently urged to clutch said first ratchet to said shaft, a second ratchet loosely mounted on said shaft and having teeth engageable by the other end of said pawl, the teeth of said second ratchet being oppositely pitched with respect to the teeth of said first ratchet, clutch means resiliently urged to clutch said second ratchet to said shaft, means connecting said shaft to drive said shiftable element in either direction, a lever tiltable to disengage said first clutch means, an element associated with said lever and movable in one direction to tilt said lever in a clutch-disengaging direction, a second lever tiltable to disengage said second clutch means, said last-named element being movable in the opposite direction to tilt said second lever in a clutch-disengaging direction, a thread on said shaft, and a member threadedly engaging said shaft thread and operatively associated with said last-named element, whereby rotation of said shaft in one direction shifts said last-named member to move said last-named element to tilt said first lever, and rotation of said shaft in the opposite direction shifts said last-named member to move said last-named element to tilt said second lever.

21. A control for a variable speed transmission having an element shiftable in opposite directions to vary oppositely the speed differential effected by said transmission, comprising an oscillating arm driven by said transmission, a double-ended pawl carried on said arm, a shaft, a first ratchet loosely mounted on said shaft and having teeth engageable by one end of said pawl, clutch means resiliently urged to clutch said first ratchet to said shaft, a second ratchet loosely mounted on said shaft and having teeth engageable by the other end of said pawl, the teeth of said second ratchet being oppositely pitched with respect to the teeth of said first ratchet, clutch means resiliently urged to clutch said second ratchet to said shaft, means connecting said shaft to drive said shiftable element in either direction, a lever tiltable to disengage said first clutch means, an element associated with said lever and movable in one direction to tilt said lever in a clutch-disengaging direction, a second lever tiltable to disengage said second clutch means, said last-named element being movable in the opposite direction to tilt said second lever in a clutch-disengaging direction, a thread on said shaft, a member threadedly engaging said shaft thread and operatively associated with said last-named element, whereby rotation of said shaft in one direction shifts said last-named member to move said last-named element to tilt said first lever, and rotation of said shaft in the opposite direction shifts said last-named member to move said last-named element to tilt said second lever, and means actuated by a predetermined number of oscillations of said arm to shift said pawl out of engagement with one of said ratchets and into engagement with the other of said ratchets.

22. In combination, an oscillating arm, a shiftable element carried by said arm, an abutment member normally positioned outside the path of said element, said member being guided for movement toward and away from said path, a rotatable element, a reciprocable member held against rotation and threadedly associated with said rotatable element, and ratchet means carried by said arm and by said rotatable element and operable, upon oscillation of said arm, to rotate said rotatable element step-by-step, said abutment member and said reciprocable member being formed with cooperating cam surfaces, whereby, as said reciprocable member is advanced by rotation of said rotatable element, said abutment member will be moved toward the path of said shiftable element.

23. In combination, an oscillating arm, a shiftable element carried by said arm, an abutment member normally positioned outside the path of said element, said member being guided for movement toward and away from said path, a rotatable element, a reciprocable member held against rotation and threadedly associated with said rotatable element, a spring resisting rotation of said rotatable element in one direction, ratchet means carried by said arm and by said rotatable element and operable, upon oscillation of said arm, to rotate said rotatable element step-by-step in opposition to the tendency of said spring to move said reciprocable member toward said abutment member, said abutment member and said reciprocable member being formed with cooperating cam surfaces, whereby, as said reciprocable member is advanced by rotation of said rotatable element, said abutment member will be moved toward the path of said shiftable element, latch means normally holding said rotatable element against rotation under the tendency of said spring, and means carried by said arm and engageable with said latch, when said arm is moved to a position beyond one limit of its normal stroke, to release said latch.

24. In combination, a shaft, a ratchet wheel mounted on said shaft, an oscillating arm, a pawl carried on said arm and shiftable into and out of cooperative relation with said ratchet, an abutment member disposed adjacent the path of travel of said pawl but normally outside said path, screw means for advancing said abutment member into the path of said pawl, means carried by said arm for actuating said screw means, upon oscillation of said arm, to advance said abutment member, means energized during such advancement, for withdrawing said abutment member, and means carried by said arm, and operable upon movement of said arm to a position beyond one limit of the normal stroke of said arm, to release said energized withdrawing means.

25. In combination, a shaft, a ratchet wheel mounted on said shaft, an oscillating arm, a pawl carried on said arm and shiftable into and out of cooperative relation with said ratchet, an abutment member disposed adjacent the path of travel of said pawl but normally outside said path, screw means for advancing said abutment member into the path of said pawl, an element rotatable to actuate said screw means, a spring operatively associated with said element, means carried by said arm for rotating said element step-by-step, upon oscillation of said arm, to advance said screw means and to wind said spring, latch means holding said element against return rotation under the influence of said spring, and means carried by said arm, and operable upon movement of said arm to a position beyond one limit of the normal stroke of said arm, to release said latch means.

26. In combination, an oscillating arm, a rock shaft carried by said arm, a shiftable element rigid with said rock shaft, an abutment member normally positioned outside the path of said element, said member being guide for movement toward and away from said path, a rotatable element, a reciprocable member held against rotation and threadedly associated with said rotatable element, ratchet means carried by said arm and by said rotatable element and operable, upon oscillation of said arm, to rotate said rotatable element step-by-step, said abutment member and said reciprocable member being formed with cooperating cam surfaces, whereby, as said reciprocable member is advanced by rotation of said rotatable element, said abutment member will be moved toward the path of said shiftable element, and means carried by said rock shaft and operable, upon shifting of said shiftable element by engagement with said abutment member, to move the ratchet means carried by said arm out of cooperative relation with the ratchet means carried by said rotatable element.

27. In combination, a first shaft, a coned disc fixed on said shaft, a second coned disc facing said first disc and splined on said shaft, a second shaft substantially parallel with said first shaft, a coned disc fixed on said second shaft, a second coned disc splined on said second shaft and facing the first disc on said second shaft, means resiliently urging one of said splined discs toward its fellow, means including a shiftable element for positively moving the other of said splined discs toward and away from its fellow, means for driving said first shaft, a belt cooperating with said disc pairs to transmit power from said first shaft to said second shaft, and control means associated with said shiftable element and driven through said second shaft for shifting said shiftable element.

28. In combination, a first shaft, a coned disc fixed on said shaft, a second coned disc facing said first disc and splined on said shaft, a second shaft substantially parallel with said first shaft, a coned disc fixed on said second shaft, a second coned disc splined on said second shaft and facing the first disc on said second shaft, means resiliently urging one of said splined discs toward its fellow, means including a shiftable element for positively moving the other of said splined discs toward and away from its fellow, means for driving said first shaft, a belt cooperating with said disc pairs to transmit power from said first shaft to said second shaft, and control means associated with said shiftable element and driven through said second shaft, said control means being operable automatically to shift said shiftable element gradually in one direction, thereafter to operate for a period without affecting said shiftable element, and thereafter gradually to return said shiftable element to its initial position, during continuing operation of said shafts.

29. The combination with a variable-speed transmission having a screw shaft rotatable in either of two opposite directions to vary the speed differential of said transmission in either direction, of means for controlling said screw shaft, comprising a shaft operatively connected to said screw shaft, two spaced clutch members splined on said shaft, a ratchet wheel loose on said shaft and operatively associated with one of said clutch members, a second, oppositely-pitched ratchet wheel loose on said shaft and with respect to said first ratchet wheel and operatively associated with the other of said clutch members, a tubular element sleeved over a portion only of the length of said shaft, an arm rigid with said tubular element and carrying a double-ended pawl positioned for alternative cooperation with both of said ratchet wheels, and means for oscillating said tubular element.

30. The combination with a variable-speed transmission having a screw shaft rotatable in either of two opposite directions to vary the speed differential of said transmission in either direction, of means for controlling said screw shaft, comprising a shaft operatively connected to said screw shaft, two spaced clutch members splined on said shaft, a ratchet wheel loose on said shaft and operatively associated with one of said clutch members, a second, oppositely-pitched ratchet wheel loose on said shaft and operatively associated with the other of said clutch members, a tubular element sleeved over a portion only of the length of said shaft, an arm rigid with said tubular element and carrying a double-ended pawl positioned for alternative cooperation with both of said ratchet wheels, means for oscillating said tubular element, spring means urging said clutch members into operative engagement with their respective ratchet wheels, and means for positively shifting either of said clutch members against the tendency of its spring means.

31. The combination with a variable-speed transmission having a screw shaft rotatable in either of two opposite directions to vary the speed differential of said transmission in either direction, of means for controlling said screw shaft, comprising a shaft operatively connected to said screw shaft, two spaced clutch members splined on said shaft, a ratchet wheel loose on said shaft and operatively associated with one of said clutch members, a second, oppositely-pitched ratchet wheel loose on said shaft and operatively associated with the other of said clutch members, a tubular element sleeved over a portion only of the length of said shaft, an arm rigid with said tubular element and carrying a double-ended pawl positioned for alternative cooperation with both of said ratchet wheels, means for oscillating said tubular element, spring means urging said clutch members into operative engagement with their respective ratchet wheels, and means actuated by rotation of said screw shaft in either direction to a predetermined degree for positively shifting one or the other of said clutch members against the tendency of its spring means.

32. The combination with a variable-speed transmission having a screw shaft rotatable in either of two opposite directions to vary the speed differential of said transmission in either direction, of means for controlling said screw shaft, comprising a double-ended pawl connected to be oscillated about an external center by the output shaft of said transmission, two ratchet wheels freely rotatable about said center and having oppositely-pitched teeth for alternative engagement by the respective ends of said pawl, two clutch members likewise rotatable about such center and adapted for alternative operative engagement with said respective ratchet wheels, spring means urging said clutch members toward such engagement, and means connecting said clutches to drive said screw shaft.

33. The combination with a variable-speed transmission having a screw shaft rotatable in either of two opposite directions to vary the speed differential of said transmission in either direction, of means for controlling said screw shaft, comprising a double-ended pawl connected to be oscillated about an external center by the output shaft of said transmission, two ratchet wheels freely rotatable about said center and having oppositely-pitched teeth for alternative engagement by the respective ends of said pawl, two clutch members likewise rotatable about such center and adapted for alternative operative engagement with said respective ratchet wheels, spring means urging said clutch members toward such engagement, means connecting said clutches to drive said screw shaft, means actuated by movement of said screw shaft in one direction to a predetermined degree to shift one of said clutch members positively out of engagement with its associated ratchet wheel, and means actuated by movement of said screw shaft in the other direction to a predetermined degree to shift the other of said clutch members positively out of engagement with its associated ratchet wheel.

PAUL B. REEVES.
HARRY E. BROOKS.

CERTIFICATE OF CORRECTION.

Reissue No. 20,309. March 23, 1937.

PAUL B. REEVES, ET AL.

It is hereby certified that error appears in the printed specification of the above numbered patent requiring correction as follows: Page 9, first column, line 64, claim 26, for the word "guide" read guided; and that the said Letters Patent should be read with this correction therein that the same may conform to the record of the case in the Patent Office.

Signed and sealed this 27th day of April, A. D. 1937.

Leslie Frazer
Acting Commissioner of Patents.

(Seal)